May 18, 1926.

O. HOY 1,585,246

FILTER

Filed Jan. 29, 1923   3 Sheets-Sheet 1

Witnesses:

Inventor:
Ole Hoy
By Joshua R. H. Potts
His Attorney

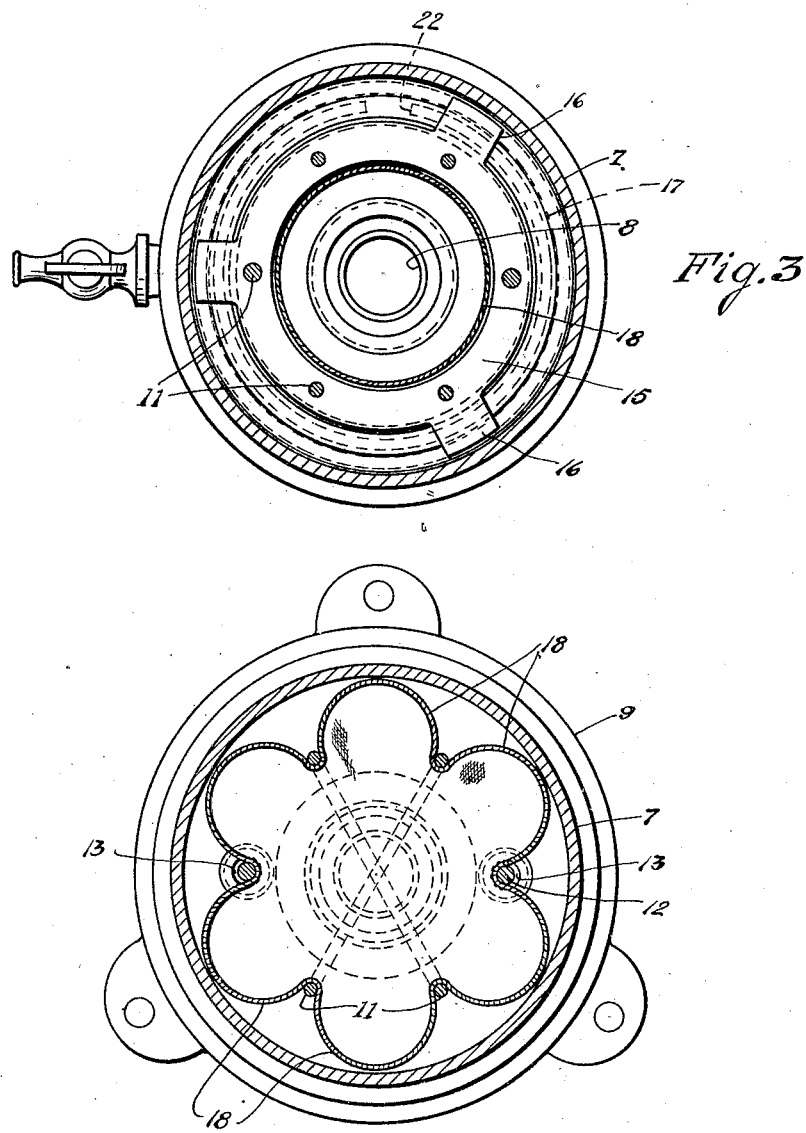

May 18, 1926.

O. HOY 1,585,246

FILTER

Filed Jan. 29, 1923    3 Sheets-Sheet 3

Witnesses:
W. Schellhardt.
B. G. Richards

Inventor:
Ole Hoy
By Joshua R. H. Potts
His Attorney

Patented May 18, 1926.

1,585,246

UNITED STATES PATENT OFFICE.

OLE HOY, OF CHICAGO, ILLINOIS.

FILTER.

Application filed January 29, 1923. Serial No. 615,504.

My invention relates to improvements in filters, especially adapted for use in filtering milk, the object of the invention being to provide a comparatively small and efficient device of this character which is of simple construction and highly efficient in use.

Other objects will appear hereinafter.

The invention consists in the combinations and arrangements of parts thereinafter described and claimed.

The invention will be best understood by reference to the accompanying drawings forming a part of this specification, and in which,—

Fig. 3 is a section taken substantially on line 3—3 of Fig. 2;

Fig. 4 is a section taken substantially on line 4—4 of Fig. 2;

Figures 1, 2:
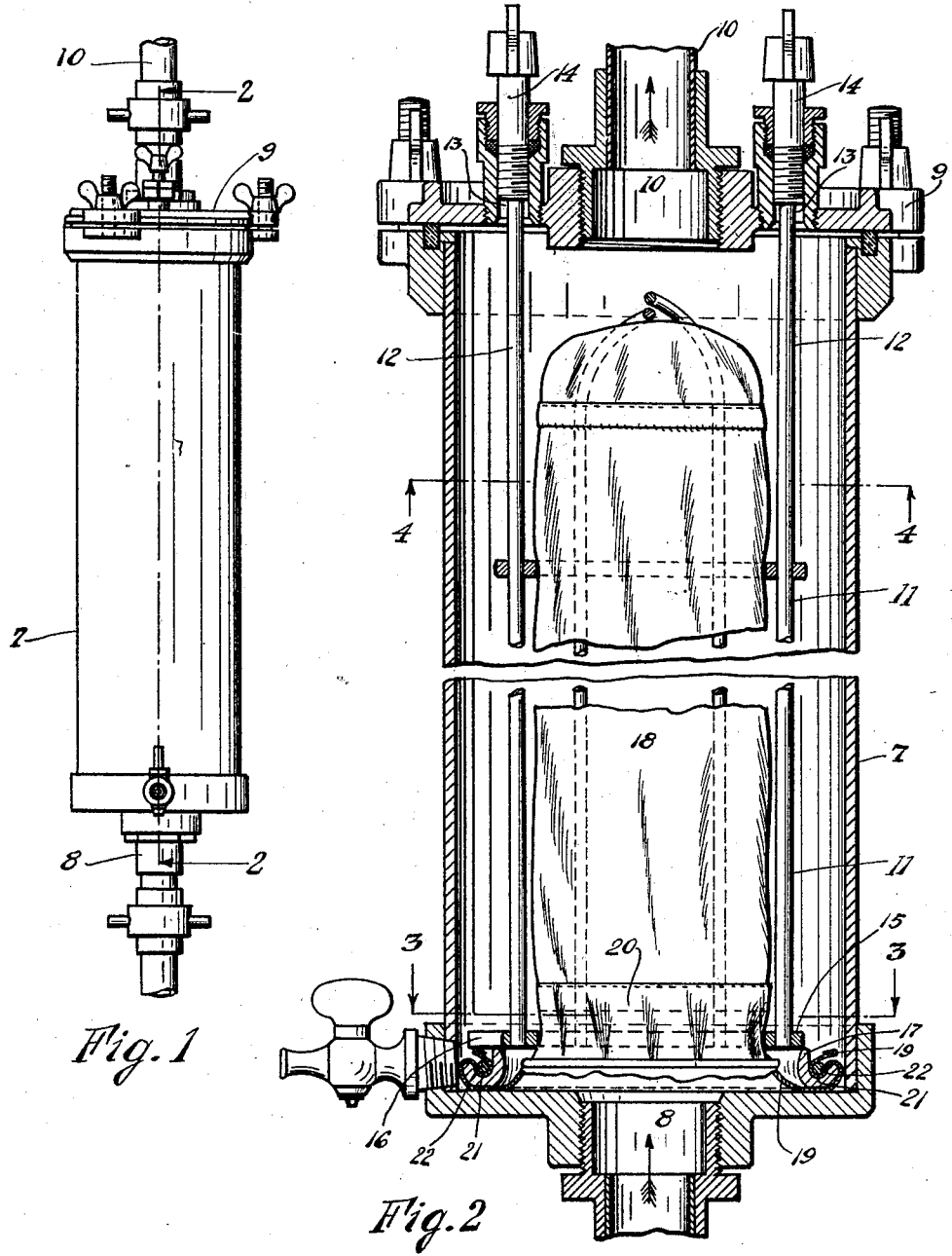
Fig. 1 is a side elevation of a filter embodying the invention.
Fig. 2 is an enlarged section taken substantially on line 2—2 of Fig. 1.
Figure 5:
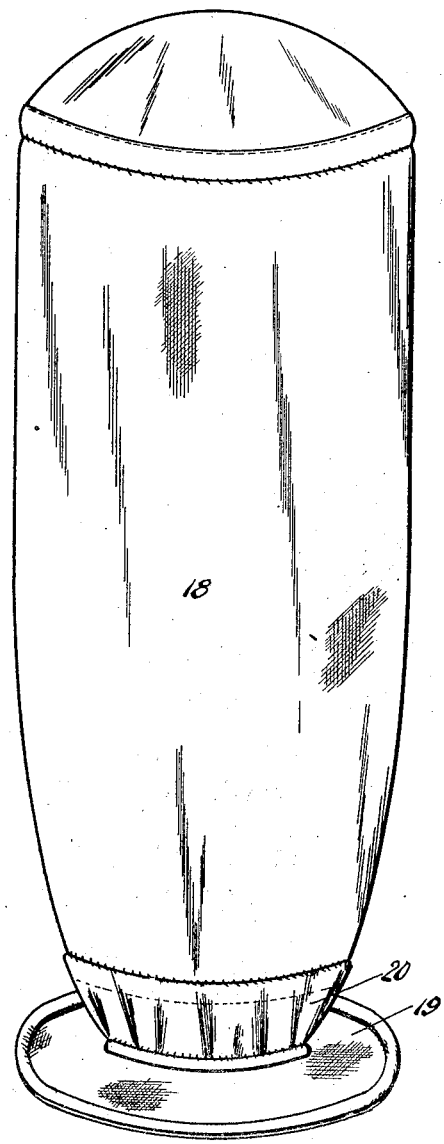
Fig. 5 is an enlarged perspective view of a filter bag employed in the construction.
Figure 6:
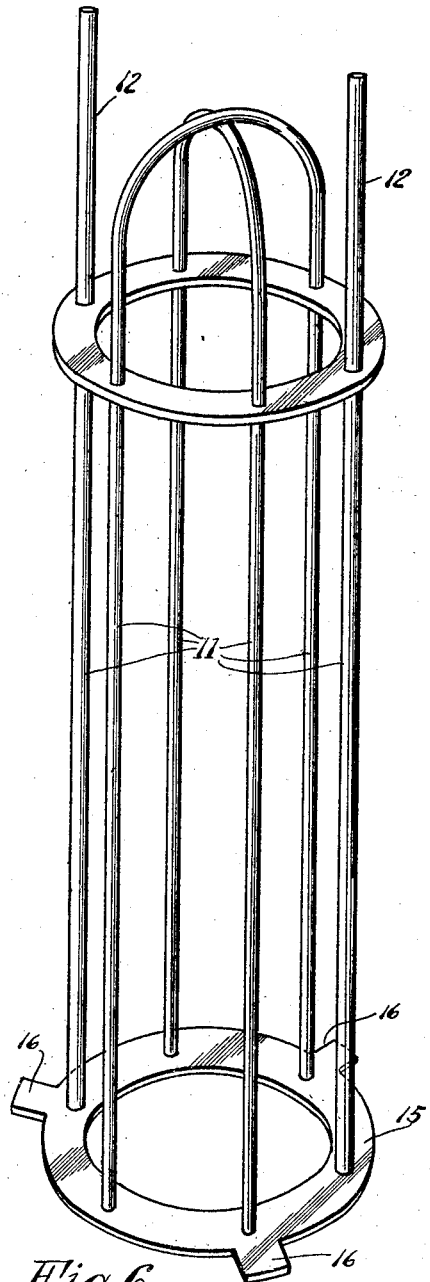
Fig. 6 is a perspective view of an open work frame employed in the construction.

The preferred form of construction as illustrated in the drawings, comprises a suitable casing 7 having an inlet pipe 8 leading centrally into the bottom thereof. The casing 7 is provided with a removable cover 9 provided with an outlet pipe 10 leading centrally therefrom as indicated. An open work frame 11 is arranged to be inserted within the casing 7, said frame being considerably smaller than said casing and provided with upwardly extending pressure rods 12 fitting into sockets 13 in the cover 9 and contacting with the lower end of adjusting screws 14 whereby said frame may be forced downwardly in said casing. The lower end of the frame 11 is open and surrounded by an annular ring 15 having radiating lugs 16 thereon said lugs 16 being adapted and arranged to rest on top of a sealing ring 17. A filter bag 18, of suitable filtering cloth, is arranged within the open work frame 11, said bag being considerably larger than said frame so that when distended by internal pressure the side walls of said bag will protrude through the openings in said frame in the form of scallops as indicated in Fig. 4 and whereby a large filtering area will be exposed. At its lower end the bag 18 is provided with an annular sealing flap 19 projecting radially therefrom in a plane substantially perpendicular to the walls of said bag as best indicated in Fig. 5. The inner edges of the flap 19 are considerably smaller than the distended size of the bag 18 and are joined by a conical flaring portion 20 with the edges of the mouth of said bag whereby a sealing flap is provided which will rest flat and without wrinkling against the bottom of the casing 7. The sealing ring 17 is ground to a nice seat against the bottom of the casing 7 and is detachably secured to the sealing flap 19 as indicated. To this end the ring 17 is provided with an annular groove 21 in the top thereof and a spring locking ring 22 is arranged to snap into said groove and hold the flap in place as best indicated in Fig. 2.

In use, the milk is passed upwardly through the filter, thus being compelled to pass through the walls thereof. The milk is forced through the filter under pressure and this pressure serves to distend the walls of the bag to force them to protrude through the open work of the frame 11, forming scallops as shown in Fig. 4, and thus exposing a relatively large area of the bag for filtering purposes. The protrusion of portions of the bag through the frame is caused by providing relatively large openings in the frame and a free space in the casing around the frame to accommodate the bag protrusions. By arranging the bag in inverted position, that is, with its open end down, the filtering process is aided by the action of gravity which tends to cause solid particles to collect on the bottom of the casing and thus not be drawn into the meshes of the bag. It is also to be noted that the frame which supports the bags also serves as the means for exerting sealing pressure on the sealing flap, thus greatly simplifying the construction and the assembling of the parts. By this arrangement a comparatively small and efficient filter will be provided which is especially adapted for use in filtering milk and which may be readily taken apart for cleaning purposes or for renewal of the filtering bag when desired.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come with the scope of the appended claims.

Having described my invention, what I claim as new and desire to secure by Letters Patent, is:

1. A filter comprising a casing having an inlet in the bottom thereof; an inverted filter bag in said casing having its edges seating on the bottom of the casing around said inlet; an open work frame surrounding said bag and holding the edges thereof against the bottom of said casing, said bag being larger than said frame to protrude through the openings therein; and a discharge for said casing, substantially as described.

2. A filter comprising a casing having an inlet; a bag in said casing having the edges of its mouth seating against the wall of said casing around said inlet; an open work frame surrounding said bag and holding its edges against said wall; and a discharge for said casing, substantially as described.

3. A filter comprising a casing having an inlet; a bag in said casing having the edges of its mouth seating against the wall of said casing around said inlet; a ring resting against said bag edges; an open work frame surrounding said bag and resting against said ring; and a discharge for said casing, substantially as described.

4. A filter comprising a casing having an inlet in the bottom thereof; an inverted bag in said casing over said inlet having the edges of its mouth seating against the wall of said casing around said inlet; a frame surrounding said bag and holding its edges against the bottom of said casing; and a discharge for said casing, substantially as described.

5. A filter comprising a casing having an inlet in the bottom thereof; an inverted bag in said casing around said inlet having the edges of its mouth seating against the bottom of said casing around said inlet; a ring resting against said bag edges; an open work frame surrounding said bag and resting against said ring, said bag being larger than said frame to protrude through the openings therein; and a discharge for said casing, substantially as described.

6. A filter comprising a casing having an inlet pipe leading centrally into the bottom thereof and an outlet pipe leading centrally from the top thereof; an inverted bag arranged in said casing around said inlet and having the edges of its mouth seating on the bottom of said casing around said inlet; a sealing ring resting over the edges of the mouth of said bag; and an open work frame arranged in said casing surrounding said bag, said bag being larger than said frame to protrude through the openings therein and said frame resting at its bottom against said sealing ring, substantially as described.

7. A filter comprising a casing having an inlet pipe leading centrally into the bottom thereof and an outlet pipe leading centrally from the top thereof; an inverted bag arranged in said casing around said inlet and having the edges of its mouth seating on the bottom of said casing around said inlet; a sealing ring resting over the edges of the mouth of said bag; an open work frame arranged in said casing surrounding said bag, said bag being larger than said frame to protrude through the openings therein and said frame resting at its bottom against said sealing ring; and means for pressing said frame downwardly against said sealing ring and the edges of said bag, substantially as described.

8. A filter bag having an annular sealing flap secured around the mouth thereof and radiating therefrom, the opening in said flap being somewhat smaller than said bag; a flaring portion joining the inner edges of said flap with the edges of said bag; and a sealing ring detachably secured to said flap, substantially as described.

9. A filter bag having an annular sealing flap secured around the mouth thereof and radiating therefrom in a plane substantially perpendicular to the walls of said bag, the opening in said flap being somewhat smaller than said bag; a flaring portion joining the inner edges of said flap with the edges of said bag; and a sealing ring detachably secured to said flap, substantially as described.

10. A filter bag having an annular sealing flap secured around the mouth thereof and radiating therefrom, the opening in said flap being somewhat smaller than said bag; a flaring portion joining the inner edges of said flap with the edges of said bag; a sealing ring detachably secured to said flap, said sealing ring being provided with an annular groove adapted and arranged to receive portions of said flap; and a spring locking ring engaging said groove to hold said ring in place, substantially as described.

In testimony whereof I have signed my name to this specification.

OLE HOY.